H. W. SARGENT.
GATHERING CONVEYER BUCKET.
APPLICATION FILED JUNE 19, 1919.
1,351,791.  Patented Sept. 7, 1920.
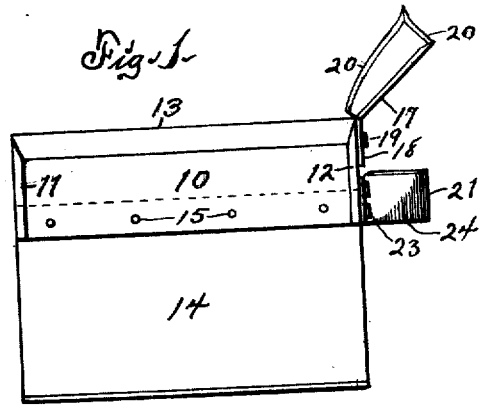
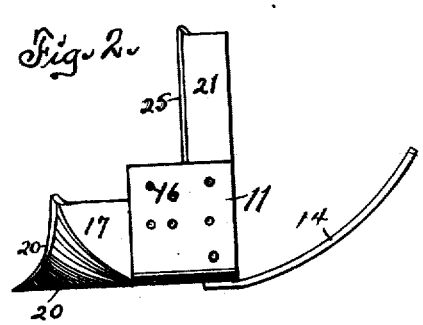
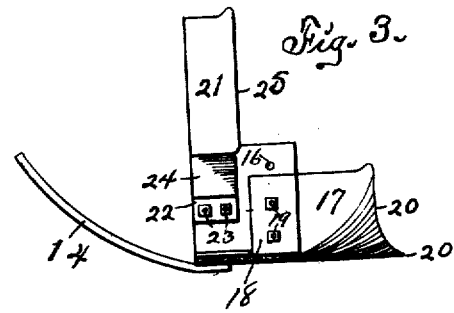
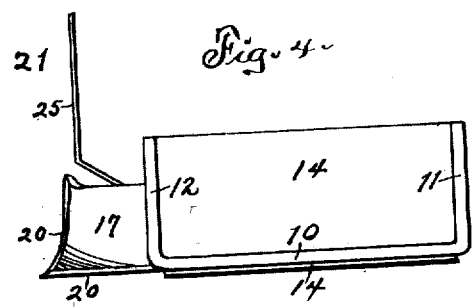
Inventor:
H. W. Sargent
By Charles Sweet
Atty.

UNITED STATES PATENT OFFICE.

HERBERT W. SARGENT, OF FORT DODGE, IOWA, ASSIGNOR TO SARGENT TILE DITCHER COMPANY, OF FORT DODGE, IOWA, A CORPORATION OF IOWA.

GATHERING CONVEYER-BUCKET.

1,351,791.  Specification of Letters Patent. Patented Sept. 7, 1920.

Application filed June 19, 1919. Serial No. 305,244.

*To all whom it may concern:*

Be it known that I, HERBERT W. SARGENT, a citizen of the United States of America, and resident of Fort Dodge, Webster county, Iowa, have invented a new and useful Gathering Conveyer-Bucket, of which the following is a specification.

The object of this invention is to provide an improved construction for a conveyer bucket.

My invention consists in the construction, arrangement and combination of elements hereinafter set forth, pointed out in the claims and illustrated by the accompanying drawing, in which—

Figure 1 is a plan of the complete device. Fig. 2 is an elevation at one side. Fig. 3 is an elevation at the opposite side and Fig. 4 is an elevation at the front of the same.

In the construction of the device as shown the foundation or basic element is a cutting member 10, which is straight and flat throughout its central and major portion and is formed with end portions 11, 12, preferably of equal length and standing in planes perpendicular to the plane of the major portion. The cutting member is formed with a beveled cutting edge 13 on one side margin, which edge continues through the length of each end portion. A plurality of holes is formed in the major portion of the cutting member 10 in a row parallel with the margin thereof opposite the cutting edge 13 and a carrying wing or scoop 14 is arranged with one margin beneath the rear margin of the cutting member and is secured thereto by fastening means, such as bolts or rivets 15 extending through said holes and through the wing. The wing or scoop is concaved and, when fastened as shown, it curves out of the plane of the central portion of the cutting member 10 and is spaced rearwardly therefrom, the rearmost margin of said wing lying substantially in the same plane as the outermost margins or ends of the end portions 11, 12. Suitable means is provided, such as may connect through a hole 16 in each end portion 11, 12, for securing the cutting member to a conveyer chain or chains not shown. A gathering member or share 17 is secured to and extends forwardly and outwardly relative to the forward or cutting margin of the end portion 12. The stem 18 of the gathering member or share 17 is arranged parallel with and on the outer face of the end portion 12 and fastening means such as bolts 19 connect them. The major portion of the gathering member or share 17 stands obliquely to the path of travel of the complete device and is curved inwardly at its outer lower corner. The gathering member or share also is formed with a cutting beveled edge 20 on its lower margin and continuing through the length of the outermost margin thereof. It is the function of the member 17 to cut and gather into the main member and scoop any substance, such as soil, to be handled by the complete device. A reamer or cutting blade 21 is provided with a stem 22 adapted to lie parallel with the outer face of the end portion 12 at the rear of the stem 19 and be secured to said end portion by fastening means such as bolts 23. The reamer or cutting blade also is offset between its ends, the major portion thereof 21 being joined to the stem 22 thereof by an oblique portion 24, by this means placing the major portion 21 in a plane parallel with the stem 22 and spaced outwardly relative to the end portion 12. In use the major portion of the reamer or cutting blade travels in substantially the same plane as the outermost portion of the share and projects a materially greater distance than the share from the bottom of the device. The forward margin of the reamer or cutting blade is formed with a cutting edge 25. All of the bevels noted are on the inside of the various elements, thus contributing to the gathering effect on substance handled by the device and tending to bring such substance into the basic element 10 and scoop 14.

The share and reamer may be placed on either end portion 11, 12 dependent on the direction of travel of the device.

This device forms a part of the machine described in my copending application filed August 2, 1919, Serial Number 314,835, to which reference hereby is made. In the operation of this machine the buckets are moved through horizontal paths and earth or other substance in such paths is engaged by the forward margin of the base element 10 and carried into the bucket by forward movement thereof; the upstanding ends 11, 12 and wing 14 serving to retain such substance in the bucket. Soil or other substance arranged in piles at one side of the path of travel of the buckets, and in the direction of advance of the machine, is engaged by the outwardly extending gathering share 17 and reamer 21; the reamer serving to cut earth or other substance loose from the pile and the share serving to cut the substance loose and also to pull or draw it into the bucket in the forward advance thereof. In this way the buckets are filled while traveling in paths at right angles to the path of advance of the machine.

I claim as my invention—

1. A gathering conveyer bucket, comprising a base element formed with a cutting edge, a concaved wing fixed to said base element opposite the cutting edge thereof, and gathering means fixed to and extending obliquely from one end of the base element adjacent said cutting edge, said gathering means extending forwardly and outwardly from such end of the base element.

2. A gathering conveyer bucket, comprising a base element formed with a cutting edge, a wing fixed to and extending rearwardly from said base element, and a concaved gathering share fixed to one end of said base element and extending obliquely therefrom adjacent said cutting edge, said gathering share extending forwardly beyond the cutting edge of said base element and outwardly from that end of the base element to which it is attached, said gathering share being curved inwardly at its outer lower corner.

3. A gathering conveyer bucket, comprising a base element formed with a cutting edge, a wing fixed to and extending rearwardly from said base element, a gathering device on one end of said base element adjacent said cutting edge, and a reamer device fixed to said base element adjacent said gathering device, said reamer having a stem adapted to lie parallel with and be secured to one end of said base element and being offset between its ends, the major portion thereof lying in a plane parallel with said stem and spaced outwardly from the end of said base element.

4. A gathering conveyer bucket, comprising a base element formed with a cutting edge and having end portions arranged at angles to its body, a gathering share fixed to one end of said base element and extending forwardly and outwardly relative to said cutting edge, and a reamer device fixed to one end of said base element adjacent said share, said reamer having a stem adapted to lie parallel with and be secured to such end of the base element and being offset between its ends, the major portion thereof lying in a plane parallel with said stem and spaced outwardly from the end of said base element, said offset portion extending a considerable distance above the base element and its end members and being beveled on its forward margin.

5. A gathering conveyer bucket, comprising a base element formed from a flat piece of metal and formed with a cutting edge and having end portions arranged substantially at right angles to its body, a wing fixed to and extending rearwardly from said base element and being disconnected from said end portions, said wing being curved upwardly toward its rear margin, gathering means fixed to and extending forwardly and outwardly from one end portion of said base element, and a reamer device fixed at one end to said end portion adjacent and at the rear of said gathering means.

Signed at Fort Dodge, in the county of Webster and State of Iowa, this 9th day of June, 1919.

HERBERT W. SARGENT.